United States Patent

Mullender et al.

Patent Number: 5,618,363
Date of Patent: Apr. 8, 1997

[54] METHOD OF MANUFACTURING A POROUS MATERIAL

[75] Inventors: Andrew J. Mullender, Nottingham; Leonard J. Rodgers, Derby, both of England

[73] Assignee: Rolls-Royce plc, London, England

[21] Appl. No.: 539,606

[22] Filed: Oct. 5, 1995

[51] Int. Cl.⁶ .......................... B32B 31/00; B64C 21/02; B64C 21/06
[52] U.S. Cl. .................. 156/62.2; 156/155; 156/242; 156/245; 156/307.7; 181/292; 244/130; 244/208; 244/209
[58] Field of Search ..................................... 244/208, 209, 244/130; 181/291, 292, 296; 156/62.2, 155, 296, 307.7, 242, 245; 264/112

[56] References Cited

U.S. PATENT DOCUMENTS 5,126,190  6/1992  Sakatani et al.
5,543,198  8/1996  Wilson ................................. 181/292 X

FOREIGN PATENT DOCUMENTS 2256253  2/1992  United Kingdom .................. 244/209
2269829  2/1994  United Kingdom .

Primary Examiner—Jeff H. Aftergut
Attorney, Agent, or Firm—Cushman Darby Cushman IP Group of Pillsbury Madison & Sutro, L.L.P.

[57] ABSTRACT

A porous material is manufactured by weaving polycarbonate fibres through a tow of carbon fibres which has been pre-impregnated with an epoxy resin. A second layer of pre-impregnated carbon fibres are superimposed on the woven layer and the epoxy resin is cured to bond the fibres together. A ceramic slurry is applied and allowed To penetrate through the second layer of fibres and part way through the woven layer of fibres to a controlled depth before being dried to form a mask. A thermoplastic powder is then applied to the unmasked region of the woven layer of fibres and sintered. Finally the mask and the polycarbonate fibres are removed chemically to produce a porous material which comprises a sintered thermoplastic layer reinforced with carbon fibres through which channels are provided.

8 Claims, 3 Drawing Sheets

METHOD OF MANUFACTURING A POROUS MATERIAL

The present invention relates to a method of manufacturing a porous material through which suction is applied to maintain laminar flow control.

The achievement of large areas of laminar air flow over the surface of an aircraft can lead to significant drag reduction and hence fuel savings.

By reshaping the surface to achieve favourable streamwise pressure gradients, the transition of the air from laminar to turbulent flow will be delayed and the surface has natural laminar flow. Alternatively air can be withdrawn or injected through a porous surface to prevent the onset of turbulence in the boundary layer of air adjacent the surface. This is known as laminar flow control. For a given application the optimum laminar flow may require a combination of some limited reshaping and laminar flow control applied in a selective manner.

It is known to manufacture aircraft surfaces, such as the wings or the aeroengine nacelle, from carbon fibre mouldings in which layers of carbon fibre in an epoxy resin matrix are moulded to shape by heat and pressure against a shaped tool surface. If laminar flow control is required on the surface then it has to be provided with a large number of very small holes. This has been achieved by drilling the carbon fibre surface with either a laser or an electron beam.

Problems with this known method of construction are that the drilling operation is expensive and time consuming. Drilled holes are subject to errors and tolerance problems and if the drilled holes are not of the correct size the laminar flow may be tripped into turbulent flow. Laser drilled holes taper and therefore must be drilled from the rear side of the surface to maximise surface quality. With either laser or electron beam drilling operations an outward airflow is required to prevent blockage of the holes with debris generated during the drilling operation.

The present invention seeks to provide a method of manufacturing a porous material which eliminates the drilling procedure and its associated problems. A porous material manufactured in accordance with the present invention has accurately defined porosity, good mechanical strength and relatively low weight.

According to the present invention a method of manufacturing a porous material comprises the steps of producing a first layer of woven fibres by interweaving carbon fibres of a certain orientation with thermoplastic fibres of a different orientation, superimposing a second layer of carbon fibres on the first layer of woven fibres, the carbon fibres in the second layer having the same orientation as the thermoplastic fibres in the first layer, bonding the first and second layers of fibres together, applying a ceramic slurry to the second layer and allowing it to penetrate through the second layer and part way through the first layer to a controlled depth, drying the ceramic slurry so that it forms a mask, applying a thermoplastic powder directly to the first layer of fibres and allowing it to penetrate until it meets the mask, sintering the thermoplastic powder and chemically removing the mask and the thermoplastic fibres in the first layer.

A porous structure manufactured in accordance with the present invention offers the advantage that the sintered thermoplastic layer is reinforced by the carbon fibres which are mechanically bonded thereto. The pores in the thermoplastic layer are created during the sintering process rather than having to be drilled in a subsequent machining operation. The pores in the sintered thermoplastic layer are smaller than the holes formed by other piercing processes. This gives aerodynamic advantages and the pore size can be controlled, by the selection of a powder having a suitable particle size, so that the pores are smaller than most dust particles.

Preferably the thermoplastic powder is polyethylene and the thermoplastic fibres are polycarbonate fibres which are chemically removed by a solvent spray of acetone.

In the preferred embodiment of the present invention the carbon fibres in the first and second layers are impregnated with an epoxy resin which when cured bonds the first and second layers together.

Preferably the ceramic slurry consists of a ceramic powder in a water soluble binder such as polyvinyl acetate.

The present invention will now be described with reference to the accompanying drawings in which.

Figure 1:
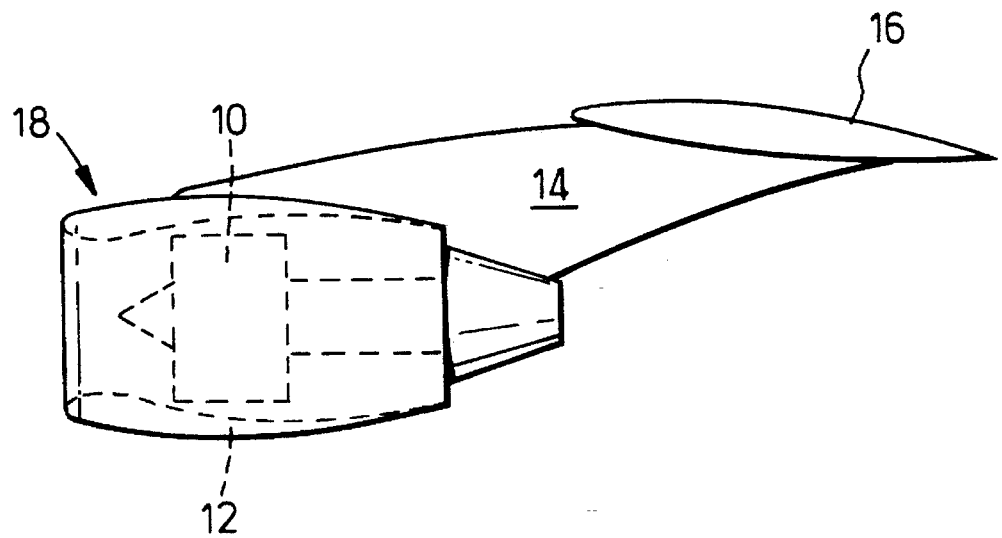
FIG. 1 is a pictorial view of an engine and nacelle installation for an aircraft.

Referring to FIG. 1, a gas turbine engine 10 is enclosed in a nacelle 12. The engine 10 and nacelle 12 are supported in conventional manner from a pylon 14 under an aircraft wing 16.

Figure 2:
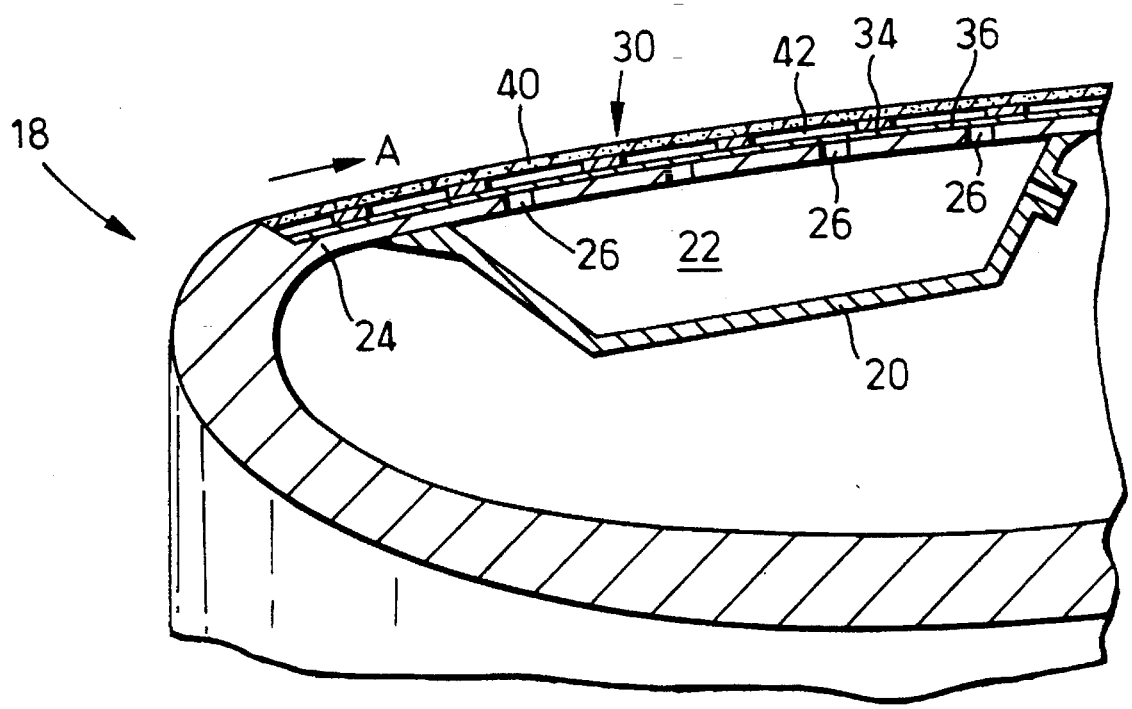
FIG. 2 is a sectional view of part of the leading edge of a nacelle having an outer porous surface in accordance with the present invention.

The leading edge 18 of the nacelle 12 comprises a porous structure 30 attached to the shaped structural surface 24 (FIG. 2). A backing plate 20 is attached to the inner surface of the shaped structural surface 24 to define a chamber 22 which can be evacuated by a suction pump (not shown).

Laminar flow control is provided at the leading edge 18 of the nacelle 12 when the aircraft is in flight. In flight a flow of air passes over the outer surface of the porous structure 30 in the direction of arrow A in FIG. 2. The chamber 22 is evacuated by the suction pump (not shown) and the boundary layer of the airflow is sucked through the porous structure 30. By sucking the boundary layer through the porous structure 30 the onset of turbulence in the air flow passing over the leading edge 18 of the nacelle 12 is prevented.

The porous structure 30 comprises a sintered thermoplastic layer 40 reinforced with carbon fibres 34 and 36, fastened to the shaped structural surface 24 of the nacelle 12. When suction is applied air passes through the sintered thermoplastic layer 40 along channels 42 in the carbon fibres 34, 36 to holes 26 provided in the surface 24 of the nacelle 12.

The sintered thermoplastic layer 40 is manufactured so that a mechanical bond exists it and the carbon fibres 34, 36.

Figure 3:
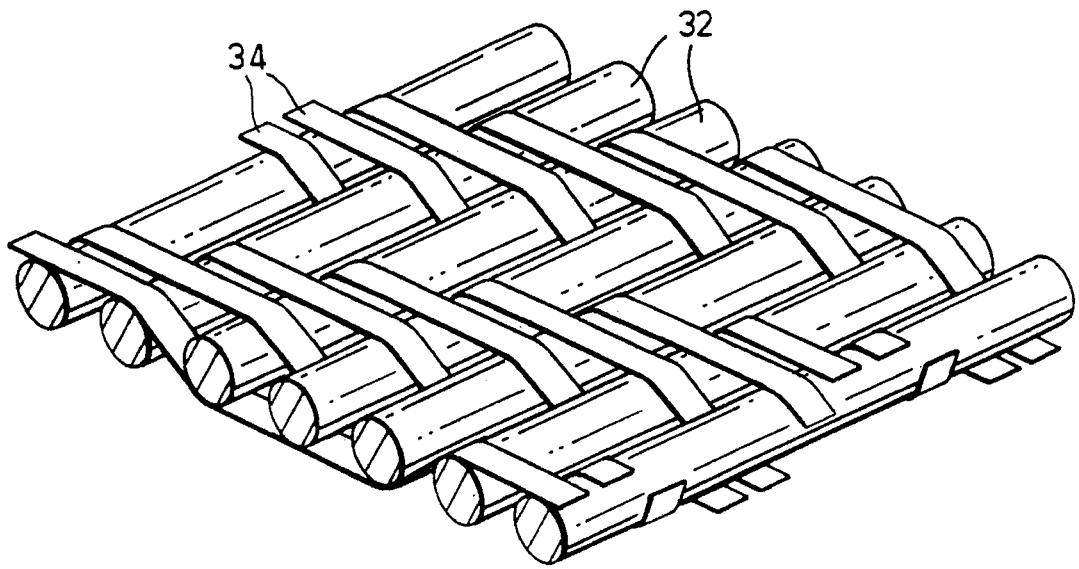
FIGS. 3–6 show the manufacture of a porous material in accordance with the present invention.
Figure 4:
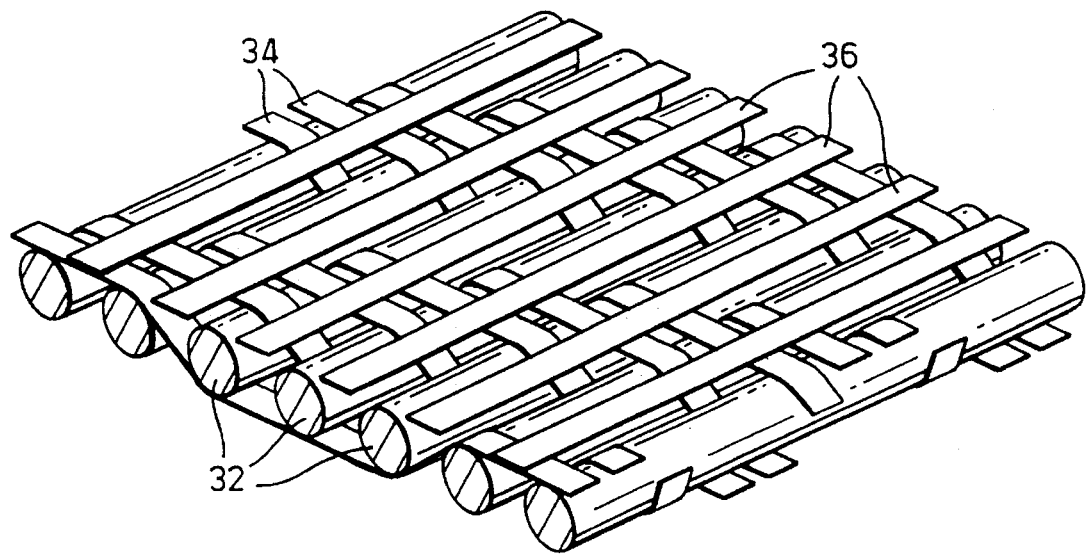

The porous structure 30 is manufactured by weaving polycarbonate fibres 32, eg nylon, through a tow of carbon fibres 34 which have been impregnated with an epoxy resin, FIG. 3. A second layer of carbon fibres 36, which have also been pre-impregnated with an epoxy resin, are superimposed on the first layer of interweaved fibres 32 and 34, FIG. 4. The carbon fibres 36 are orientated in the same direction as the nylon fibres 32 in the first layer.

The pre-impregnated carbon fibres 34 and 36 are then cured at 120° C. so that the epoxy resin bonds the fibres 32, 34 and 36 together.

Figure 5:
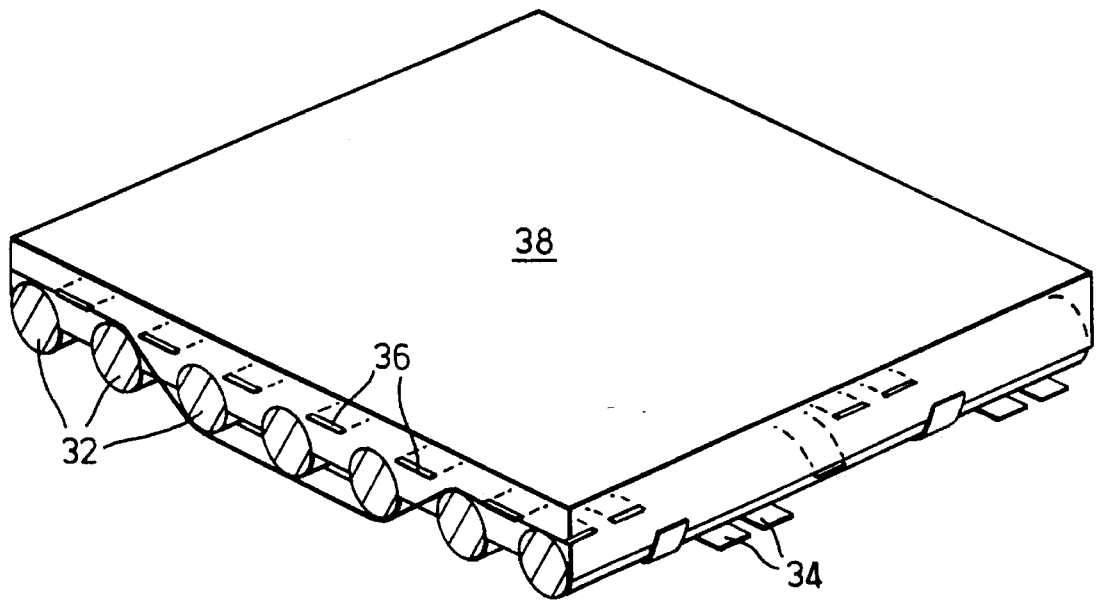

A ceramic slurry, consisting of a ceramic powder in a polyvinyl acetate binder, is then applied by slip casting. The slurry penetrates through the second layer of carbon fibres 36 and part way through the first layer of woven fibres 32 and 34, FIG. 5. The slurry penetrates to a controlled depth before being dried to form a mask 38.

A thermoplastic powder, such as polyethylene, is applied directly onto the outer surface of the first layer of woven fibres 32 and 34. The polyethylene powder penetrates through the first layer of woven fibres 32, 34 until it meets the previously applied mask 38. The assembly is then heat treated and rolled to sinter the thermoplastic powder into a porous layer 40 which is mechanically locked to the first layer of woven fibres 32 and 34.

Figure 6:
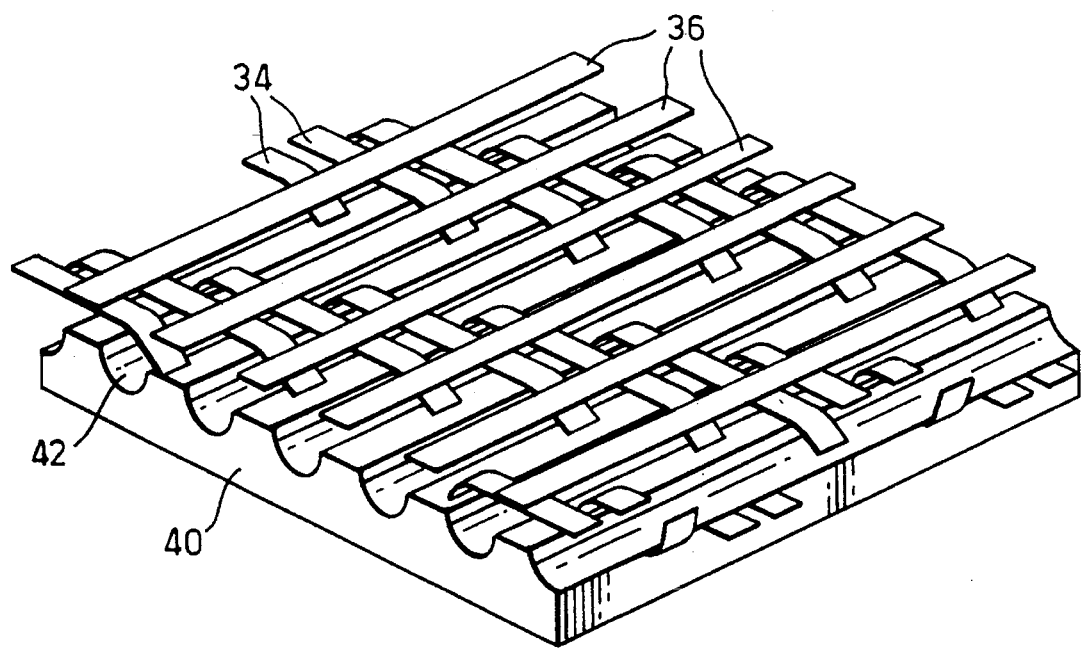

The mask 38 is removed by warm water which dissolves the polyvinyl acetate binder and washes out the ceramic powder. The nylon fibres 32 are then dissolved in a solvent such as acetone to leave channels 42. FIG. 6 shows the porous material after the mask 38 and the nylon fibres 32 have been removed.

The porous material is fastened, preferably by adhesive, to the shaped structural surface 24 of the nacelle 12. When suction is applied air passes through the sintered thermoplastic layer 40 and along the channels 42 to holes 26 provided in the surface 24 of the nacelle 12.

The porous material shown in FIG. 6 may be cut to shape and is flexible enough to fit any curvature found in practice on nacelle surfaces 24. Since the sintered thermoplastic layer 40 is mechanically locked to the carbon fibres 34 and 36 the surface is resistant to delamination and will allow air to be blown through it if required.

It will be appreciated by one skilled in the art that variations are possible within the process described. Different thermoplastic fibres 32 may be used in the first woven layer provided they are resistant to the binder used in the ceramic slurry and will not melt at the epoxy cure temperature. Both the thermoplastic fibres 32 and the ceramic binder must be chosen to resist the sinter temperature of the thermoplastic powder. Similarly the thermoplastic powder used to form the porous layer 40 must be chosen to give the required pore size and permeability for laminar flow control and must resist the solvents used to remove the thermoplastic fibres 32 and the mask 38. Variations in the porosity of the thermoplastic layer can be achieved by sintering powders having different particle sizes and/or varying the thickness of the porous layer.

Although a porous structure in accordance with the present invention has been described with reference to a nacelle 12 for an aircraft engine 10 it will be appreciated by one skilled in the art that it could have other applications. In particular it could be used to produce aircraft wings and other parts of the aircraft where laminar flow control is required to minimise the aerodynamic drag.

We claim:

1. A method of manufacturing a porous material comprising the steps of producing a layer of woven fibres by interweaving carbon fibres of a certain orientation with thermoplastic fibres of a different orientation, superimposing a second layer of carbon fibres on the first layer of woven fibres, the carbon fibres in the second layer having the same orientation as the thermoplastic fibres in the first layer, bonding the first and second layers of fibres together, applying a ceramic slurry to the second layer and allowing it to penetrate through the second layer and part way through the first layer to a controlled depth, drying the ceramic slurry so that it forms a mask, applying a thermoplastic powder directly to the first layer of fibres and allowing it to penetrate until it meets the mask, sintering the thermoplastic powder and chemically removing the mask and the thermoplastic fibres in the first layer.

2. A method as claimed in claim 1 in which the thermoplastic powder is polyethylene.

3. A method as claimed in claim 1 in which the thermoplastic fibres in the first layer are polycarbonate fibres.

4. A method as claimed in claim 3 in which the polycarbonate fibres are chemically removed by a solvent spray.

5. A method as claimed in claim 4 in which the solvent is acetone.

6. A method as claimed in claim 1 in which the carbon fibres in the first and second layers are impregnated with an epoxy resin which when cured bonds the first and second layers together.

7. A method as claimed in claim 1 in which the slurry consists of a ceramic powder in a water soluble binder.

8. A method as claimed in claim 7 in which the binder is polyvinyl acetate.

* * * * *